(12) United States Patent
Yasumura

(10) Patent No.: US 6,310,786 B1
(45) Date of Patent: Oct. 30, 2001

(54) SWITCHING POWER-SUPPLY CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/668,083

(22) Filed: Sep. 22, 2000

(30) Foreign Application Priority Data

Sep. 24, 1999 (JP) ................................................ 11-270584

(51) Int. Cl.$^7$ ................................................ H02M 3/335
(52) U.S. Cl. ..................................... 363/21.03; 363/21.07
(58) Field of Search ........................... 363/21.02, 21.03, 363/21.07

(56) References Cited

U.S. PATENT DOCUMENTS

| | | | |
|---|---|---|---|
| 5,424,933 | * | 6/1995 | Illingworth ........................ 363/21.07 |
| 5,481,449 | | 1/1996 | Kheraluwala et al. . |
| 5,617,305 | | 4/1997 | Numata . |
| 5,673,184 | | 9/1997 | Rilly et al. . |
| 5,886,516 | | 3/1999 | Barrett . |

FOREIGN PATENT DOCUMENTS

| | | |
|---|---|---|
| 0 700 145 | 3/1996 | (EP) . |
| 0 707 376 | 4/1996 | (EP) . |
| 99 16163 | 4/1999 | (WO) . |

OTHER PUBLICATIONS

Patent Abstracts of Japan vol. 015, No. 258 (E–1084), Jun. 28, 1991 (1991–06–28) & JP 03 082366 A (Fujitsu Denso LTD), Apr. 8, 1991 (1991–04–08).

* cited by examiner

*Primary Examiner*—Shawn Riley
(74) *Attorney, Agent, or Firm*—Frommer Lawrence & Haug LLP.; William S. Frommer

(57) ABSTRACT

The present invention relates to a switching power-supply circuit comprising: rectifying and smoothing means for generating a rectified and smoothed voltage and outputting the rectified and smoothed voltage as a direct-current input voltage; an insulating converter transformer for transferring a primary-side output to a secondary side; switching means for intermittently passing on the direct-current input voltage to a primary winding of the insulating converter transformer; a primary-side resonance circuit translating an operation of the switching means into voltage resonance; power-factor improvement means for improving a power factor by generating intermittently a rectified current based on the fed-back switching output voltage; a secondary-side resonance circuit on a secondary side of the insulating converter transformer; direct-current output voltage generation means carrying out a rectification operation in order to generate a secondary-side direct-current output voltage; and constant-voltage control means for executing constant-voltage control on the secondary-side direct-current output voltage.

2 Claims, 9 Drawing Sheets

FIG. 4A  VAC 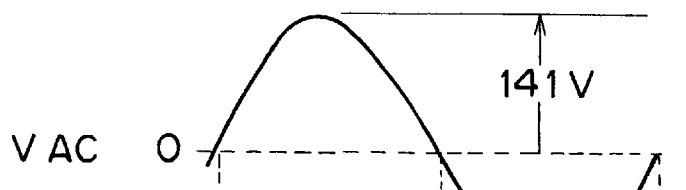
FIG. 4B  IAC 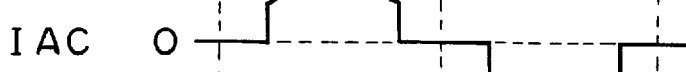
FIG. 4C  V2 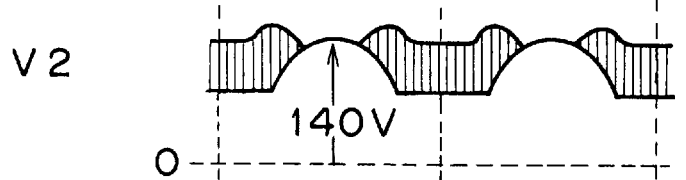
FIG. 4D  ILS 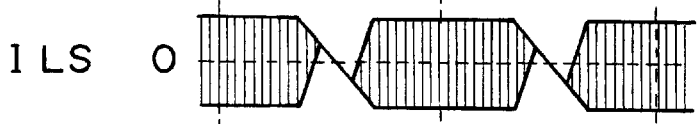
FIG. 4E  IC3 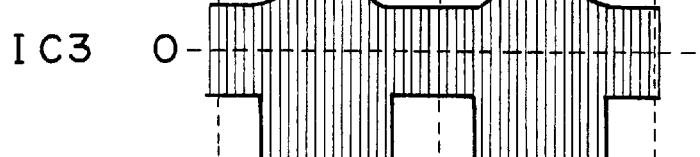
FIG. 4F  ID1 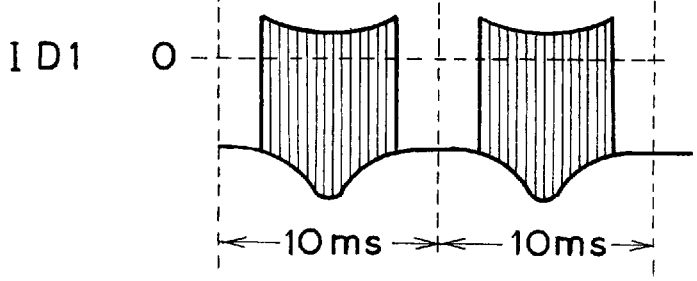

F I G. 5A  V1
F I G. 5B  V3
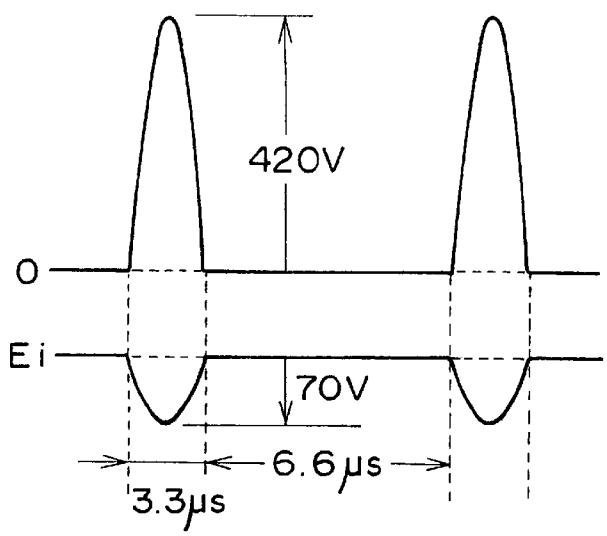
F I G. 6
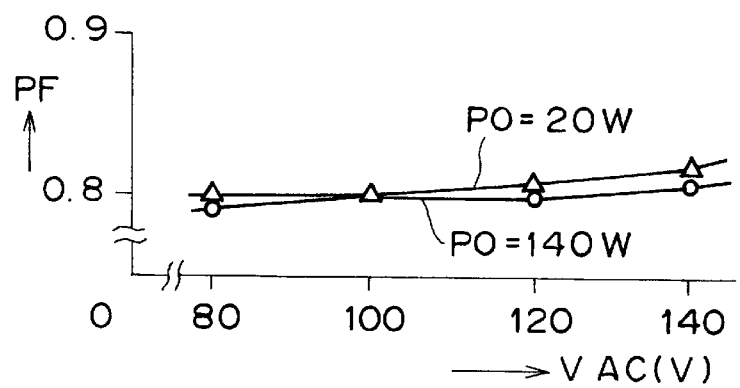
F I G. 7
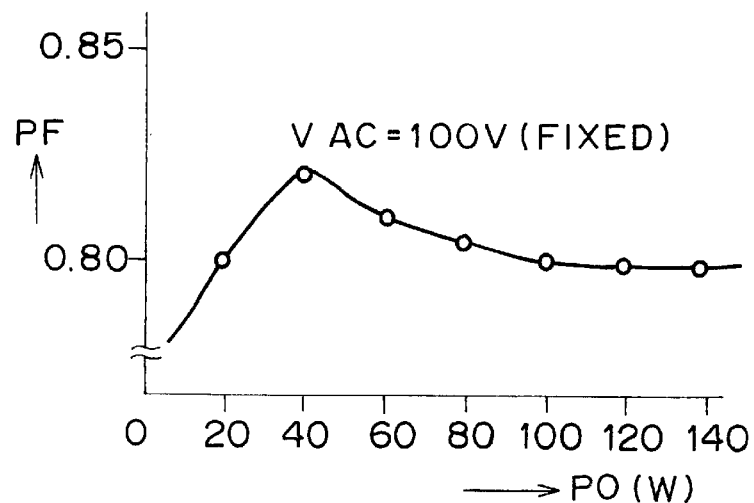

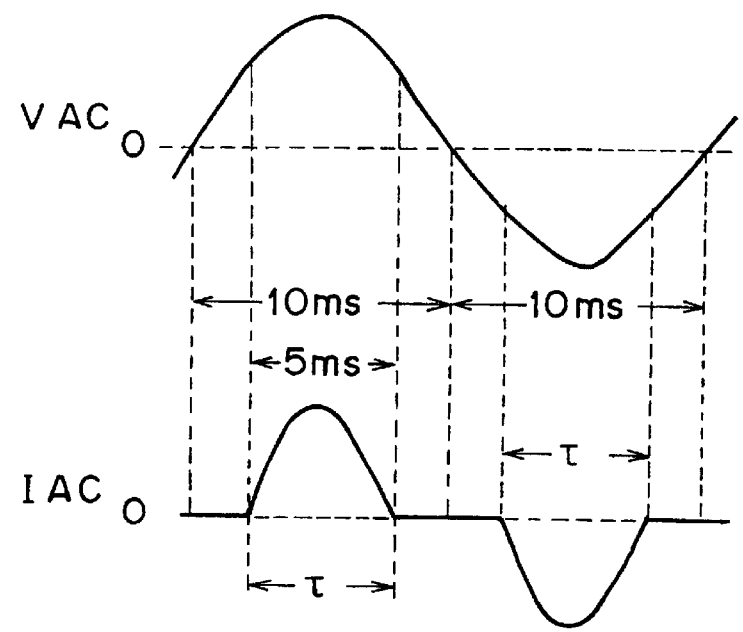
FIG. 13A (PRIOR ART)
FIG. 13B (PRIOR ART)
PO max = 120W, VAC = 100V
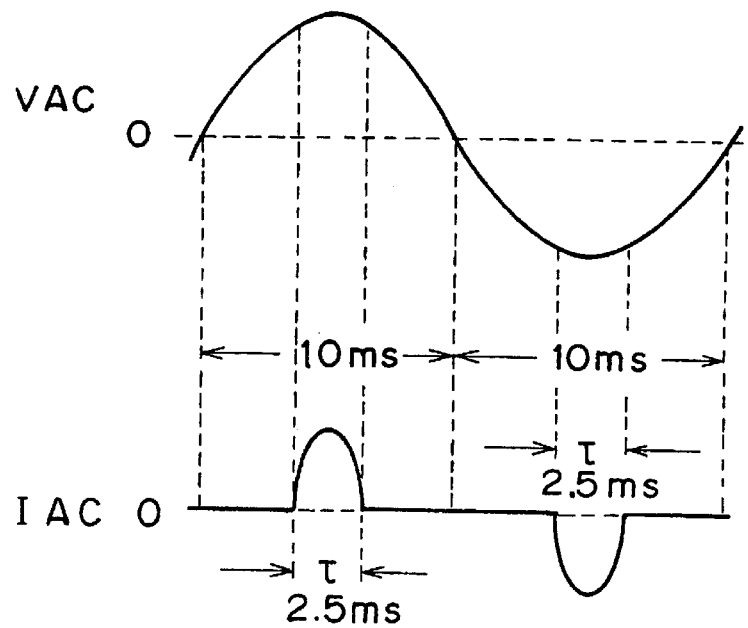
FIG. 13C (PRIOR ART)
FIG. 13D (PRIOR ART)
PO min = 40W, VAC = 100V

US 6,310,786 B1

SWITCHING POWER-SUPPLY CIRCUIT

BACKGROUND OF THE INVENTION

The present invention relates to a switching power-supply circuit having a power-factor improvement circuit.

The applicant for a patent of the present invention earlier proposed a variety of switching power-supply circuits each having a resonance-type converter on the primary side. In addition, there have been proposed a variety of switching power-supply circuits each having a power-factor improvement circuit for improving a power factor for the resonance-type converter.

FIG. 9 is a circuit diagram showing a typical switching power-supply circuit with a configuration based on an invention proposed earlier by the applicant for a patent of the present invention. To put it in detail, the configuration of this switching power-supply circuit includes a power-factor improvement circuit for improving the power factor of a switching converter of a current-resonance type based on a self-excitation technique.

The switching power-supply circuit shown in the figure includes a bridge rectifier circuit Di for full-wave rectification of the commercial AC power supply AC. A rectified output obtained as a result of the full-wave rectification by the bridge rectifier circuit Di is electrically charged into a smoothing capacitor Ci by way of a power-factor improvement circuit 20. As a result, a rectified and smoothed voltage Ei corresponding to a 1-time level of the AC input voltage VAC appears between the terminals of the smoothing capacitor Ci.

In addition, a rush-current limitation resistor Ri is inserted into a circuit comprising the bridge rectifier circuit Di and the smoothing capacitor Ci on a rectified-current path thereof. To put it in detail, the rush-current limitation resistor Ri limits a rush current flowing to the smoothing capacitor Ci when the power supply is turned on.

The power-factor improvement circuit 20 shown in the figure includes a filter choke coil LN and a high-speed recovery diode D1, which are connected to each other in series between a positive-electrode output terminal of the bridge rectifier circuit Di and the positive-electrode terminal of the smoothing capacitor Ci. One end of a choke coil LS is connected to the cathode of the high-speed recovery diode D1.

One terminal of a filter capacitor CN is connected to a connection between the anode of the high-speed recovery diode D1 and the positive-electrode terminal of the smoothing capacitor Ci. The other terminal of the filter capacitor CN is connected to the other end of the choke coil LS. The filter capacitor CN functions as a normal-mode low-pass filter in conjunction with the filter choke coil LN.

The connection point between the high-speed recovery diode D1 and the choke coil LS in the power-factor improvement circuit 20 is connected to a terminal of the primary side of a transformer PIT (Power Isolation Transformer) to be described later by a capacitor C1, which forms a series-resonance circuit in conjunction with an inductor L1 of a winding N1 on the primary side. With such a connection, a switching output generated by switching devices to be described later is fed back to the series-resonance circuit.

A power-factor improvement operation of the power-factor improvement circuit 20 will be described later.

The switching power-supply circuit also includes a converter of a current-resonance type adopting a self-excitation technique. This self-excitation current-resonance converter uses a rectified and smoothed voltage Ei appearing between the terminals of the smoothing capacitor Ci as an operation power supply.

As shown in the figure, the converter employs 2 switching devices Q1 and Q2 wired to each other in half-bridge connection between the positive-electrode terminal of the smoothing capacitor Ci and the ground to which the negative-electrode terminal of the smoothing capacitor Ci is connected. The switching devices Q1 and Q2 are each a bipolar transistor.

A start resistor RS1 is connected between the collector and the base of the switching device Q1. By the same token, a start resistor RS2 is connected between the collector and the base of the switching device Q2. A resistor RB1 connected to the base of the switching device Q1 through a resonance capacitor CB1 sets a base current (also referred to as a drive current) of the switching device Q1. Similarly, a resistor RB2 connected to the base of the switching device Q2 through a resonance capacitor CB2 sets a base current (also referred to as a drive current) of the switching device Q2. A clamp diode DD1 is connected between the emitter and the base of the switching device Q1. Likewise, a clamp diode DD2 is connected between the emitter and the base of the switching device Q2. The clamp diode DD1 forms a current path of a clamp current flowing through the base and the emitter of the switching device Q1 when the switching device Q1 is put in an off state. By the same token, the clamp diode DD2 forms a current path of a clamp current flowing through the base and the emitter of the switching device Q2 when the switching device Q2 is put in an off state.

The resonance capacitor CB1 forms a seriesresonance circuit for self-excitation oscillation in conjunction with a driving winding NB1 employed in a drive transformer PRT (power regulating transformer) to be described next, and sets the switching frequency of the switching device Q1. Likewise, the resonance capacitor CB2 forms a series-resonance circuit for self-excitation oscillation in conjunction with a driving winding NB2 employed in the drive transformer PRT, and sets the switching frequency of the switching device Q2. It should be noted that the series-resonance circuit is also referred to as a self-excitation oscillation driving circuit.

The drive transformer PRT drives the switching devices Q1 and Q2 as well as executes constant-voltage control by controlling variations in switching frequency. In the switching power-supply circuit shown in the figure, the driving windings NB1 and NB2, a resonance-current detection winding ND and a control winding NC oriented in a direction perpendicular to the driving windings NB1 and NB2 and the resonance-current detection winding ND form an orthogonal saturatable reactor.

One end of the driving winding NB1 employed in the drive transformer PRT is connected to the base of the switching device Q1 by a series connection of the resistor RB1 and the resonance capacitor CB1 whereas the other end of the driving winding NB1 is connected to the emitter of the switching device Q1. By the same token, one end of the driving winding NB2 employed in the drive transformer PRT is connected to the base of the switching device Q2 by a series connection of the resistor RB2 and the resonance capacitor CB2 whereas the other end of the driving winding NB2 is connected to the emitter of the switching device Q2. The driving windings NB1 and NB2 are wound in such directions that a voltage generated by the former has a polarity opposite to a voltage generated by the latter.

An insulating converter transformer PIT (Power Isolation Transformer) delivers outputs of the switching devices Q1 and Q2 on the secondary side. By connecting one end of the primary winding N1 of the insulating converter transformer PIT to a connection point (or a switching-output point) between the emitter of the switching device Q1 and the collector of the switching device Q2 through the resonance-current detection winding ND, a switching output is obtained.

As described above, the other end of the primary winding N1 is connected by the series-resonance capacitor C1 to a connection point between the cathode of the high-speed recovery diode D1 and the choke coil LS in the power-factor improvement circuit 20.

That is to say, the series-resonance capacitor C1 is connected in series to the primary winding N1. The capacitance of the series-resonance capacitor C1 and the leakage inductance of the insulating converter transformer PIT including the inductance L1 of the primary winding N1 form a primary-side series-resonance circuit for making the operation of the switching converter an operation of a current-resonance type. That is why the primary winding N1 is also referred to as a series-resonance winding.

On the secondary side of the insulating converter transformer PIT, a center tap is provided at the center of a secondary winding N2. The anodes of rectifier diodes D01 and D03 are connected to an upper-end tap and an upper middle tap of the secondary winding N2 respectively. By the same token, the anodes of rectifier diodes D02 and D04 are connected to a lower-end tap and a lower middle tap of the secondary winding N2 respectively. A smoothing capacitor C01 is connected between the ground and the cathodes of the rectifier diodes D01 and D02 to form a first full-wave rectification circuit. Likewise, a smoothing capacitor C02 is connected between the ground and the cathodes of the rectifier diodes D03 and D04 to form a second full-wave rectification circuit. The first full-wave rectification circuit comprising the smoothing capacitor C01 and the rectifier diodes D01 and D02 generates a direct-current output voltage E01. Similarly, the second full-wave rectification circuit comprising the smoothing capacitor C02 and the rectifier diodes D03 and D04 generates a direct-current output voltage E02.

It should be noted that the direct-current output voltage E01 and the direct-current output voltage E02 are supplied separately to a control circuit 1. The control circuit 1 uses the direct-current output voltage E01 as a detection voltage and the direct-current output voltage E02 as an operation power supply.

The control circuit 1 executes constant-voltage control to be described later. To put it concretely, the control circuit 1 supplies a DC current to the control winding NC of the drive transformer PRT as a control current. Typically, the magnitude of the control current is adjusted in accordance with variations in direct-current output voltage E01 on the secondary side.

The switching power-supply circuit with a configuration described above carries out a switching operation as follows. First of all, when the commercial AC power supply is turned on, activation currents are supplied to the bases of the switching devices Q1 and Q2 by way of the start resistors RS1 and RS2. Assuming that the switching device Q1 is turned on earlier, control is executed to turn off the switching device Q2. As an output of the switching device Q1, a resonance current flows to the resonance-current detection winding ND, the primary winding N1 and the series-resonance capacitor C1. Control is executed to turn off the switching device Q1 but turn on the switching device Q2 as the magnitude of the resonance current approaches 0. This time, as an output of the switching device Q2, a resonance current flows in a direction opposite to the resonance current generated as the output of the switching device Q1. Thereafter, a self-excitation switching operation wherein the switching device Q1 and the switching device Q2 are turned on alternately is started.

As described above, the switching device Q1 and the switching device Q2 are alternately and repeatedly turned on and off with the voltage between the terminals of the smoothing capacitor Ci used as an operation power supply. As a result, a drive current having a waveform close to a resonance-current waveform is supplied to the primary winding N1 of the insulating converter transformer PIT and an AC output is obtained at the secondary winding N2 thereof.

The constant-voltage control cited earlier is executed by the drive transformer PRT as follows.

Assuming that the secondary-side output voltage E01 increases due to a change in AC input voltage and/or a change in load, the control current flowing through the control winding NC is also controlled to rise in accordance with the increase in the secondary-side output voltage E01.

Due to an effect of a magnetic flux generated by this control current in the drive transformer PRT, the drive transformer PRT approaches a saturated state, exhibiting an effect of decreasing the inductances of the driving windings NB1 and NB2. Thus, the condition of the self-excitation resonance circuit changes, increasing the switching frequency.

In this switching power-supply circuit, upper-side control is executed. That is to say, the switching frequency is set at a value in a frequency region higher than the resonance frequency of the series-resonance circuit, which comprises the series-resonance capacitor C1 and the inductor L1 of the primary winding N1. As the switching frequency is controlled to rise as described above, the switching frequency departs from the resonance frequency of the series-resonance circuit. As a result, the resonance impedance of the series-resonance circuit for the switching output increases.

When the resonance impedance increases as described above, a drive current supplied to the primary winding N1 of the series-resonance circuit on the primary side is limited. As a result, the output voltage appearing on the secondary side is also limited by constant-voltage control.

The constant-voltage control based on the technique described above is referred to hereafter as a switching-frequency control method.

The power-factor improvement circuit 20 carries out a power-factor improvement operation as follows.

In the configuration of the power-factor improvement circuit 20 shown in the figure, the switching output supplied to the series-resonance circuit comprising the inductor L1 of the primary winding N1 and the series-resonance capacitor C1 is fed back to the rectified-current path by way of an inductive reactance (or magnetic coupling) of the choke coil LS itself.

The switching output fed back as described above causes an alternating voltage having a switching period to be superposed on the rectified-current path. The superposition of the alternating voltage having the switching period in turn causes a rectified current to flow through the high-speed recovery diode D1 intermittently at the switching period. The intermittent flow of the rectified current causes the inductances of the filter choke coil LN and the choke coil LS to appear higher. Thus, also during a period in which the level of the rectified output voltage is lower than the voltage appearing between the terminals of the smoothing capacitor Ci, a charging current flows to the smoothing capacitor Ci.

As a result, the average waveform of the AC input current approaches the waveform of the AC input voltage and the conduction angle of the AC input current increases to improve the power factor.

FIG. 10 is a circuit diagram showing another typical configuration of the switching power supply circuit with a configuration based on the present invention proposed earlier by the applicant for a patent of the present invention. This switching power-supply circuit also includes a current-resonance converter in which 2 switching devices are wired to form a half-bridge junction. A separate-excitation technique is adopted as a driving method. The configuration of this switching power-supply circuit also includes a power-factor improvement circuit for improving the power factor.

It should be noted that components identical with those employed in the switching power-supply circuit shown in FIG. 9 are denoted by the same reference numerals as the latter and their explanation is not repeated.

As shown in the figure, the current-resonance converter on the primary side employs 2 switching devices Q11 and Q12, which are each implemented by typically a MOS-FET.

The drain of the switching device Q11 is connected to the line of a rectified and smoothed voltage E1. The source of the switching device Q11 is connected to the drain of the switching device Q12. The source of the switching device Q12 is connected to the ground on the primary side. With such connections, a half-bridge junction associated with the separate-excitation technique is resulted in.

The switching devices Q11 and Q12 are driven by an oscillation and drive circuit 2 to turn on and off alternately and repeatedly in switching operations to output the rectified and smoothed voltage Ei intermittently.

A clamp diode DD1 is connected between the drain and the source of the switching device Q11 in a direction shown in the figure. By the same token, a clamp diode DD2 is connected between the drain and the source of the switching device Q12 in a direction shown in the figure.

By connecting one end of the primary winding N1 of the insulating converter transformer PIT to the connection point (also referred to as a switching output point) between the source of the switching device Q11 and the drain of the switching device Q12, the switching output can be supplied to the primary winding N1. The other end of the primary winding N1 is connected to the connection point between the filter choke coil LN and the anode of the high-speed recovery diode D1 in the power-factor improvement circuit 21 to be described later.

Also in the case of the switching power-supply circuit shown in FIG. 10, the series-resonance capacitor C1 is connected in series to the primary winding N1. The capacitance of the series-resonance capacitor C1 and the leakage inductance of the insulating converter transformer PIT including the inductance of the primary winding N1 form a primary-side series-resonance circuit for making the operation of the switching power-supply circuit an operation of a current-resonance type.

The control circuit 1 of this configuration outputs a control signal with a level representing typically a variation in direct-current output voltage E01. In the oscillation and drive circuit 2, the frequencies of switching driving signals supplied by the oscillation and drive circuit 2 to the gates of the switching devices Q11 and Q12 are varied in accordance with the control signal received from the control circuit 1 in order to change the switching frequency.

Also in the switching power-supply circuit shown in FIG. 10, the switching frequency is set at a value in an area higher than the series-resonance frequency as is the case with the switching power-supply circuit shown in FIG. 9. When the direct-current output voltage E01 rises, for example, the oscillation and drive circuit 2 is controlled by the control circuit 1 so that the switching frequency also increases in accordance with the level of the direct-current output voltage E01, therby to execute the constant voltage control.

A start circuit 3 detects a voltage or a current on the rectified and smoothed line and activates the oscillation and drive circuit 2 right after the power supply is turned on. A low-level direct-current voltage obtained by rectifying a winding additionally provided in the insulating converter transformer PIT is supplied to the start circuit 3 as an operation power supply.

The power-factor improvement circuit 21 shown in the figure includes a filter choke coil LN and a high-speed recovery diode D1, which are connected to each other in series between a positive-electrode output terminal of the bridge rectifier circuit Di and the positive-electrode terminal of the smoothing capacitor Ci. A filter capacitor CN is connected in parallel to the series connection circuit comprising the filter choke coil LN and the high-speed recovery diode D1. Also in this connection, the filter capacitor CN functions as a normal-mode low-pass filter in conjunction with the filter choke coil LN.

A resonance capacitor C3 is connected in parallel to the high-speed recovery diode D1. Typically, the resonance capacitor C3 forms a parallel-resonance circuit in conjunction with a component such as the filter choke coil LN. The parallel-resonance circuit is set to have a resonance frequency about equal to the resonance frequency of a series-resonance circuit to be described later. In this way, there is exhibited an effect of suppression of an increase in rectified and smoothed voltage Ei caused by a reduced load. No more detailed description is given.

As described earlier, the connection point between the filter choke coil LN and the anode of the high-speed recovery diode D1 in the power-factor improvement circuit 21 is connected to the aforementioned series-resonance circuit comprising an inductor L1 of the primary winding N1 and the series-resonance capacitor C1.

In the connection described above, a switching output obtained at the primary winding N1 is fed back to the rectified-current path by way of electrostatic-capacitance coupling of the series-resonance capacitor C1. To put it in detail, the switching output is fed back so that a resonance current obtained at the primary winding N1 flows to the connection point between the filter choke coil LN and the anode of the high-speed recovery diode D1, applying the switching output to the connection point.

The switching output fed back as described above causes an alternating voltage having a switching period to be superposed on the rectified-current path. The superposition of the alternating voltage having the switching period in turn causes a rectified current to flow through the high-speed recovery diode D1 intermittently at the switching period. The intermittent flow of the rectified current causes the inductances of the filter choke coil LN to appear higher.

In addition, since a current with the switching period flows through the resonance capacitor C3, a voltage appears between the terminals of the resonance capacitor C3. The level of the rectified and smoothed voltage Ei decreases by an amount equal to the voltage appearing between the terminals of the resonance capacitor C3. Thus, even during a period in which the rectified output voltage level is lower than the voltage appearing between the terminals of the smoothing capacitor Ci, a charging current flows into the smoothing capacitor Ci.

As a result, the average waveform of the AC input current approaches the waveform of the AC input voltage and the conduction angle of the AC input current increases to improve the power factor as is the case with the switching power-supply circuit shown in FIG. 9.

By providing the switching power-supply circuits shown in FIGS. 9 and 10 with the power-factor improvement circuits 20 and 21 respectively as described above, the power factor can be improved. Since the power-factor improvement circuits 20 and 21 shown in these figures each employ a small number of components, the power-factor improvement circuits 20 and 21 each offer merits that the power factor can be improved with a high degree of efficiency, at a small amount of noise, by using a circuit with a small size and a small weight and at a low cost.

FIG. 11 is a diagram showing a relation between the load power Po and the power factor PF for the switching power-supply circuits shown in FIGS. 9 and 10. It should be noted that an AC input voltage VAC of 100 V is set as a condition.

The relation shown in the figure represents a characteristic of the power factor PF decreasing with reductions in load power Po as is obvious from the figure.

FIG. 12 is a diagram showing relations between the AC input voltage VAC and the power factor PF. These relations represent characteristics with a maximum load power Pomax of 120 W and a minimum load power Pomin of 40 W set as conditions.

As is obvious from the figure, the power factor PF decreases proportionally with increases in AC input voltage VAC.

In addition, the power factor PF for the minimum load power Pomin of 40 W is lower than the power factor PF for the maximum load power Pomax of 120 W. This relation agrees with the characteristic of FIG. 11, which shows a lower power factor PF for a smaller load power Po.

FIGS. 13A to 13D are diagrams showing operation waveforms for the characteristics shown in FIG. 12.

To be more specific, FIG. 13A is a diagram showing the waveform of the AC input voltage VAC for an AC input voltage VAC of 100 V and at a maximum load power Pomax of 120 W. FIG. 13B is a diagram showing the waveform of the AC input current IAC for an AC input voltage VAC of 100 V and at a maximum load power Pomax of 120 W. FIG. 13C is a diagram showing the waveform of the AC input voltage VAC for an AC input voltage VAC of 100 V and at a minimum load power Pomin of 40 W. FIG. 13D is a diagram showing the waveform of the AC input current IAC for an AC input voltage VAC of 100 V and at a minimum load power Pomin of 40 W.

Assuming that the half period of the AC input voltage VAC is 10 ms, at the maximum load power Pomax of 120 W, the conduction period τ of the AC input current IAC is actually about 5 ms and the power factor PF is thus 0.85. At the minimum load power Pomin of 40 W, on the other hand, the conduction period τ of the AC input current IAC decreases to about 2.5 ms and the power factor PF is also reduced to about 0.65. The value of the power factor PF for the minimum load power Pomin of 40 W may not be a satisfactory value of a power factor PF required by some applications.

A decrease in power factor caused by a change in AC input voltage and/or a change in load power, conversely speaking, means a limitation on the AC input voltage condition and/or the load power condition for the switching power-supply circuit. That is to say, there is raised a problem of limited kinds of equipment that can employ the switching power-supply circuit.

To put it concretely, while a switching power-supply circuit can be employed in a television receiver with specified AC input voltage and/or the load power conditions, the same switching power-supply circuit may not be usable in office or information equipment.

In addition, in the configurations of FIGS. 9 and 10 for improving the power factor, the series-resonance circuit on the primary side is connected to the rectified-current path of the commercial AC power supply. As a result, ripples with the commercial AC power-supply frequency of 50 or 60 Hz are superposed on the series-resonance circuit as is generally known. The superposition level of the ripple component becomes higher with an increase in load power.

Assuming that the configuration includes components that are selected to maintain the power factor PF at about 0.8 as measured under predetermined conditions for an application, as is generally known, the voltage level of ripples appearing in the direct-current output voltage on the second side at a maximum load power increases by about 3 to 4 times in comparison with a case including no power-factor improvement circuit.

In order to suppress the increase in ripple component level described above, in the actual implementation of the switching power-supply circuits shown in FIGS. 9 and 10, the gain of the control circuit 1 and/or the capacitance of the smoothing capacitor Ci on the primary side are increased. In this case, however, there will be problems of an increased component cost and a switching operation prone to oscillation.

SUMMARY OF THE INVENTION

In order to solve the problems described above, the present invention provides a switching power-supply circuit comprising: rectifying and smoothing means for inputting a commercial AC power supply, generating a rectified and smoothed voltage and outputting the rectified and smoothed voltage as a direct-current input voltage; an insulating converter transformer for transferring a primary-side output to a secondary side wherein a gap is created to give a required coupling coefficient providing loose coupling; switching means including a switching device for intermittently passing on the direct-current input voltage to a primary winding of the insulating converter transformer; a primary-side resonance circuit translating an operation of the switching means into voltage resonance and comprising a leakage inductance component including at least a primary winding of the insulating converter transformer and a capacitance component including a primary-side parallel-resonance capacitor; power-factor improvement means for improving a power factor by: feeding back a switching output voltage obtained at the primary-side resonance circuit to the power-factor improvement means by way a tertiary winding formed by winding up a primary winding of the insulating converter transformer, and a series-resonance capacitor by supplying the switching output voltage to a rectified-current path; and generating intermittently a rectified current based on the fed-back switching output voltage; a secondary-side resonance circuit comprising a leakage inductance component including a secondary winding of the insulating converter transformer and a capacitance component including a secondary-side resonance capacitor on a secondary side of the insulating converter transformer; direct-current output voltage generation means including the secondary-side resonance circuit and carrying out operations to input and rectify an alternating voltage obtained at a secondary winding of the insulating converter transformer in order to generate a secondary-side direct-current output voltage; and constant-voltage control means for executing constant-voltage control on the secondary-side direct-current output voltage in accordance with the level of the secondary-side direct-current output voltage.

The power-factor improvement means employs a high-speed recovery diode for making a flow of a rectified current intermittent, and the series-resonance capacitor is connected between a cathode of the high-speed recovery diode and the tertiary winding.

In the configuration described above, a switching output voltage obtained at the primary-side resonance circuit is fed back to the power-factor improvement circuit employed in the switching power-supply circuit called a compound resonance converter by way of the tertiary winding and the series-resonance capacitor.

BRIEF DESCRIPTION OF THE DRAWINGS

FIGS. 4A, 4B, 4C, 4D, 4E and 4F are diagrams showing waveforms of various signals observed in operations carried out by the switching power-supply circuit implemented by the first embodiment;

FIGS. 5A, 5B are diagrams showing waveforms of various signals observed in operations carried out by the switching power-supply circuit implemented by the first embodiment;

FIG. 6 is a characteristic diagram showing a relation between the load power and the power factor for the switching power-supply circuit implemented by the first embodiment;

FIG. 7 is a characteristic diagram showing relations between the AC input voltage and the power factor for the switching power-supply circuit implemented by the first embodiment;

FIGS. 13A, 13B, 13C and 13D are diagrams showing waveforms of the voltage and the current of the commercial AC power supply, which vary in dependence on the load power, for the switching power-supply circuit of the prior art.

DETAILED DESCRIPTION OF THE PREFERRED EMBODIMENTS

Figure 1:
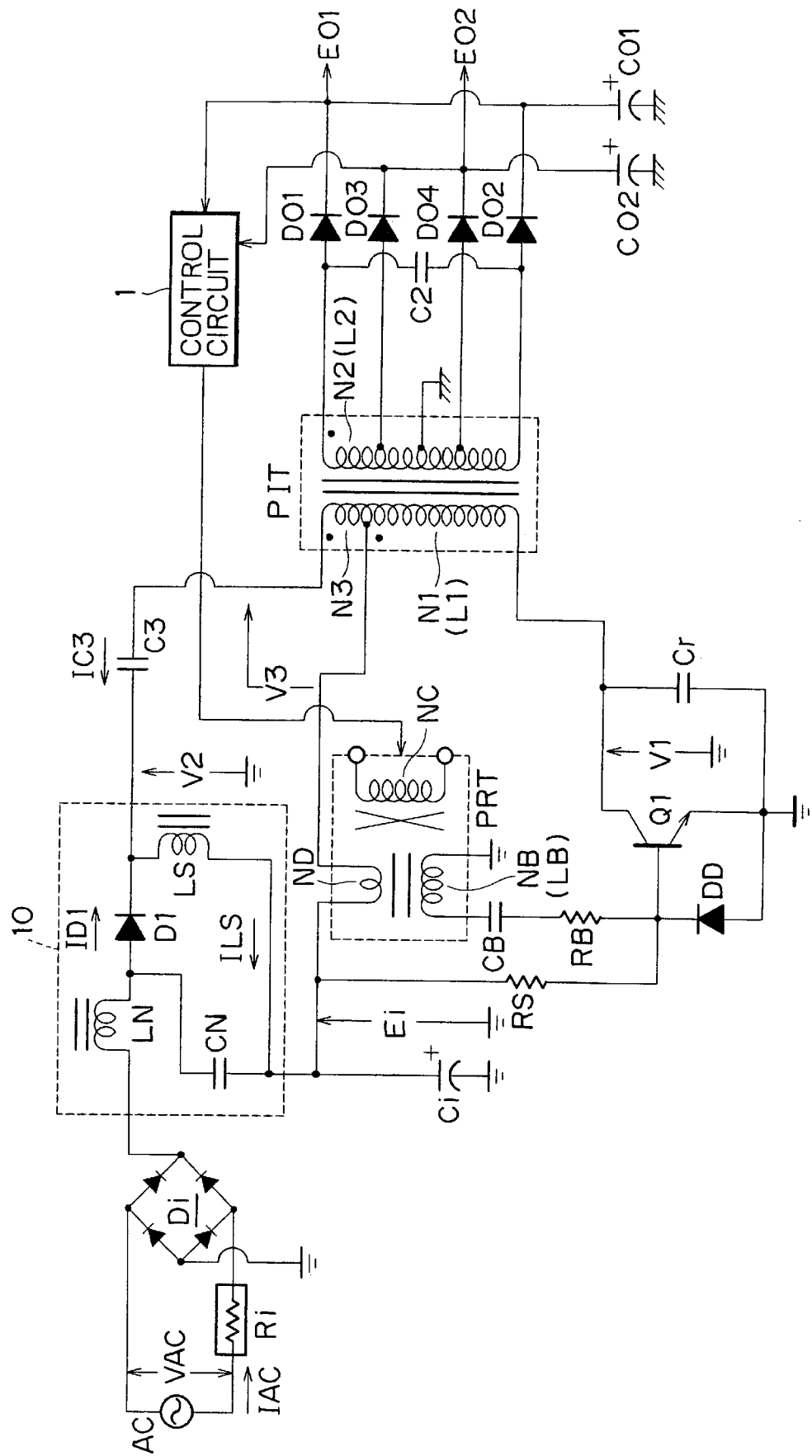
FIG. 1 is a circuit diagram showing the configuration of a switching power-supply circuit implemented by a first embodiment of the present invention.
Figure 9:
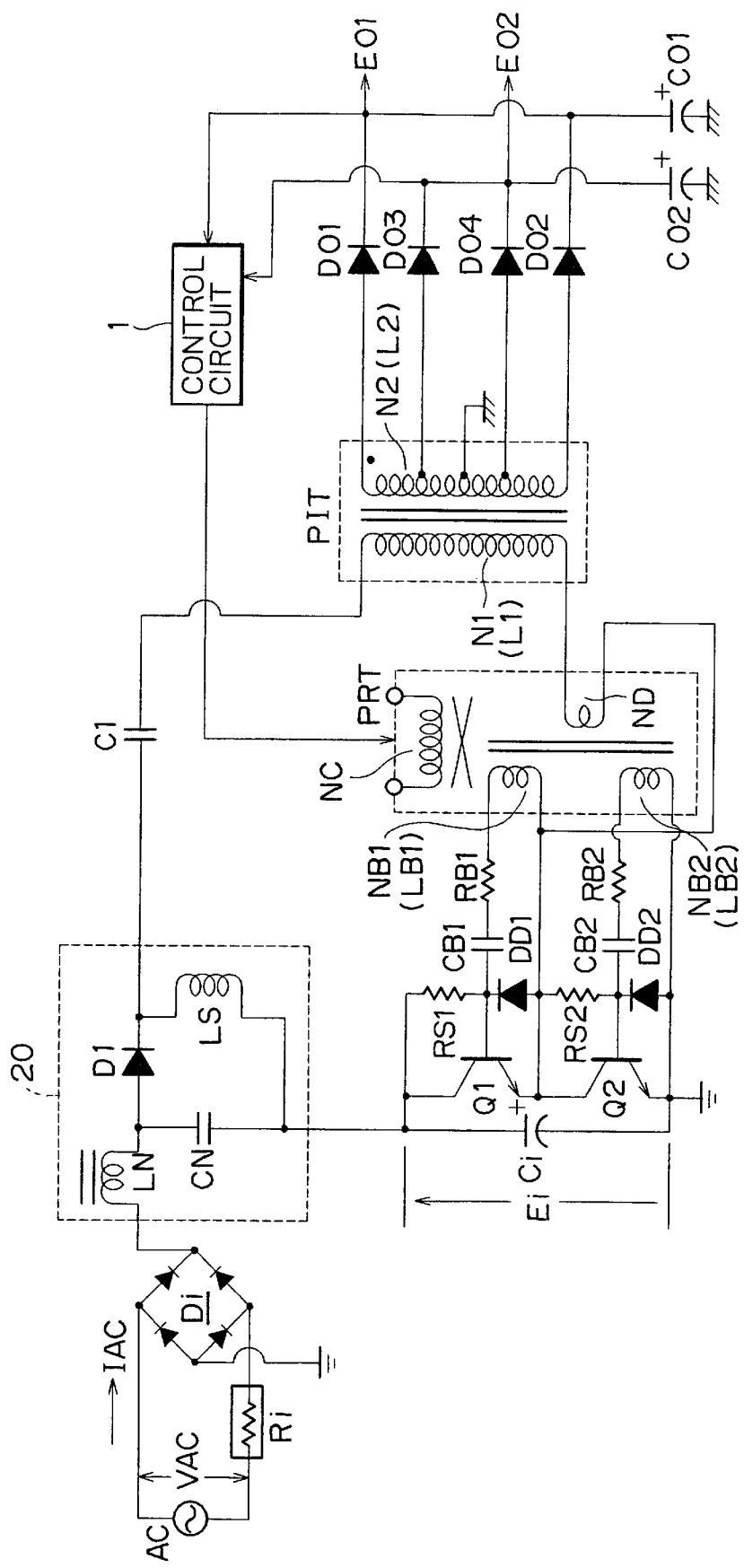
FIG. 9 is a circuit diagram showing the configuration of a switching power-supply circuit adopting an advanced technology.
Figure 10:
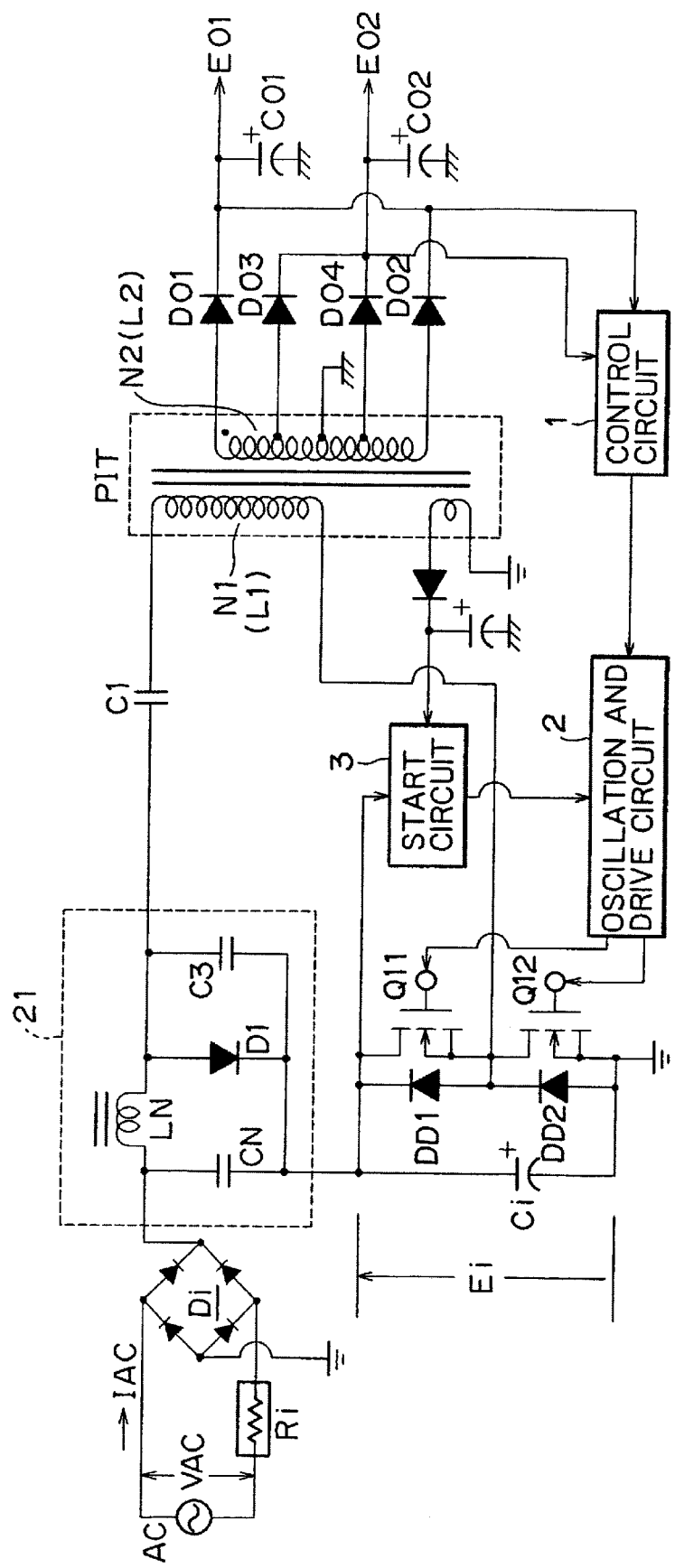
FIG. 10 is a circuit diagram showing the configuration of a switching power-supply circuit of the prior art.
Figure 11:
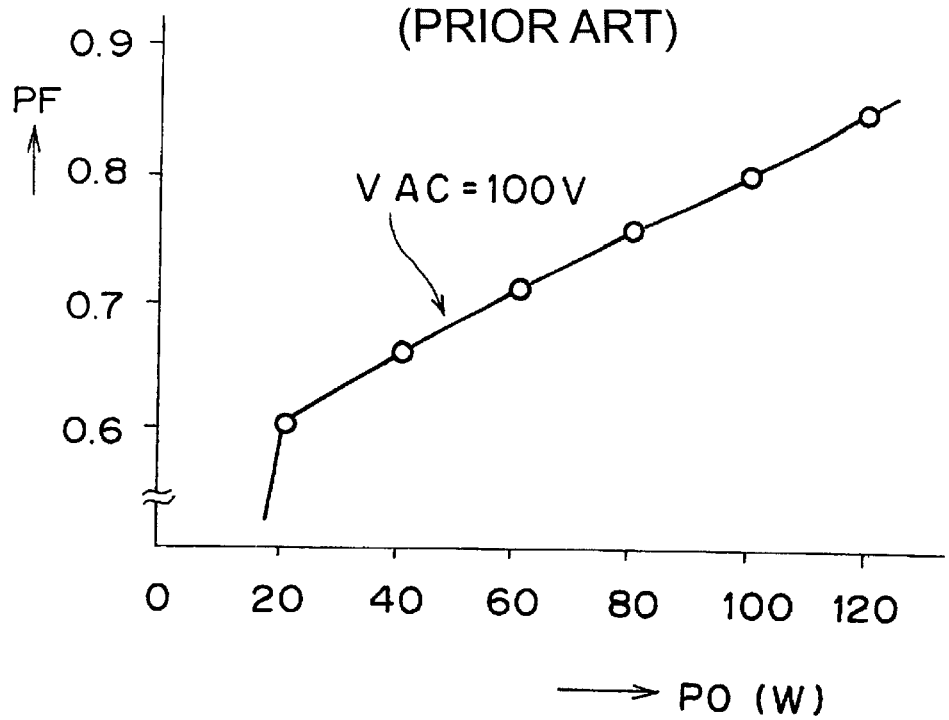
FIG. 11 is a characteristic diagram showing a relation between the load power and the power factor for the switching power-supply circuit of the prior art.
Figure 12:
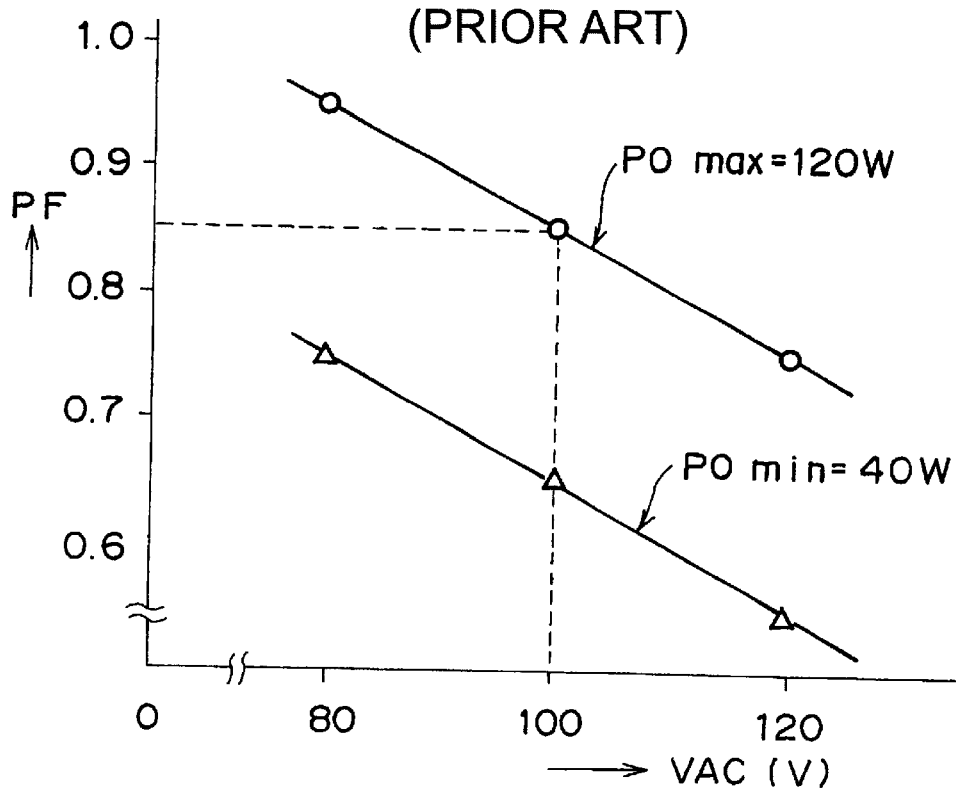
FIG. 12 is a characteristic diagram showing relations between the AC input voltage and the power factor for the switching power-supply circuit of the prior art.

FIG. 1 is a circuit diagram showing the configuration of a switching power-supply circuit implemented by a first embodiment of the present invention. It should be noted that components identical with those employed in the power-supply circuits shown in FIG. 9 or 10 are denoted by the same reference numerals as the latter, and their explanation is not repeated.

As shown in FIG. 1, a switching converter of a voltage-resonance type (also referred to as a voltage-resonance switching converter) is provided on the primary side of the switching power-supply circuit. A power-factor improvement circuit is provided for the voltage-resonance switching converter.

The switching power-supply circuit shown in the figure also includes a bridge rectifier circuit Di for carrying out full-wave rectification on a commercial AC power supply AC. A rectified output obtained as a result of rectification by the bridge rectifier circuit Di is electrically charged into a smoothing capacitor Ci by way of a power-factor improvement circuit 10 to generate a rectified and smoothed voltage Ei between the terminals of the smoothing capacitor Ci.

The configuration of the power-factor improvement circuit 10 will be described later. First of all, the configuration of the voltage-resonance converter is explained.

The voltage-resonance converter has a self-excitation configuration, which employs only one switching device Q1. As the switching device Q1, a bipolar transistor BJT (bipolar junction transistor) with a high withstand voltage is employed.

The base of the switching device Q1 is connected to the positive-electrode terminal of the smoothing capacitor Ci (the positive side of the rectified and smoothed voltage Ei) by way of a start resistor Rs so that a base current at activation can be obtained on a rectified and smoothed line. A series connection circuit comprising a driving winding NB, a resonance capacitor CB and a base-current limitation resistor RB is connected between the base of the switching device Q1 and the ground on the primary side. The series connection circuit serves as a self-excitation oscillation driving circuit, that is, a resonance circuit for driving self-excited oscillation.

A clamp diode DD inserted between the base of the switching device Q1 and a negative-electrode terminal of the smoothing capacitor Ci (or the ground on the primary side) forms a path for a clamp current that flows while the switching device Q1 is in an off state.

The collector of the switching device Q1 is connected to the positive-electrode terminal of the smoothing capacitor Ci by a series connection comprising a detection winding ND and a primary winding Ni. The emitter is connected to the ground on the primary side.

The collector and emitter of the switching device Q1 are also connected to a parallel-resonance capacitor Cr. The capacitance of the parallel-resonance capacitor Cr and the leakage inductance L1 of the primary winding N1 employed in an insulating converter transformer PIT to be described later form a primary-side parallel-resonance circuit of the voltage-resonance converter. When the switching device Q1 is turned off, the voltage appearing between the terminals of the parallel-resonance capacitor Cr exhibits a sinusoidal pulse waveform to result in a voltage-resonance operation due to the effect of the parallel-resonance circuit. No more detailed description is given.

An orthogonal control transformer PRT shown in the figure is a saturatable reactor comprising a detection winding ND, a driving winding NB and a control winding NC. The orthogonal control transformer PRT is provided for driving the switching device Q1 and executing the constant-voltage control.

The structure of the orthogonal control transformer PRT is not shown in the figure. The structure comprises 2 cores each having a shape resembling the E character. The E-shaped cores each have 4 magnetic legs, that is, 2 legs at the ends and 2 legs in the middle of the E-character shape. The ends of the 4 magnetic legs of one of the cores are joined to the ends of the 4 legs of the other core to form a cubical core. For predetermined 2 magnetic legs of the cubical core, the detection winding ND and the driving winding NB are wound in the same winding direction. On the other hand, the control winding NC is wound in a direction perpendicular to the winding direction of the detection winding ND and the driving winding NB.

The detection winding ND employed in the orthogonal control transformer PRT (variable-frequency means) is connected in series to the primary winding N1 of the insulating converter transformer PIT to be described later so that the switching output of the switching device Q1 can be propagated to the detection winding ND by way of the primary winding N1.

In the orthogonal control transformer PRT, the switching output obtained at the detection winding ND excites the driving winding NB through the transformer coupling. As a result, an alternating voltage is generated at the driving winding NB as a drive voltage. The drive voltage is output from the series-resonance circuit comprising the driving winding NB and the resonance capacitor CB to the base of the switching device Q1 through the base-current limitation resistor RB as a drive current. The series-resonance circuit forms a self-excitation oscillation driving circuit. As a result, the switching device Q1 carries out switching operations at a switching frequency, which is determined by the resonance frequency of the series-resonance circuit comprising the driving winding NB and the resonance capacitor CB.

Figure 2:
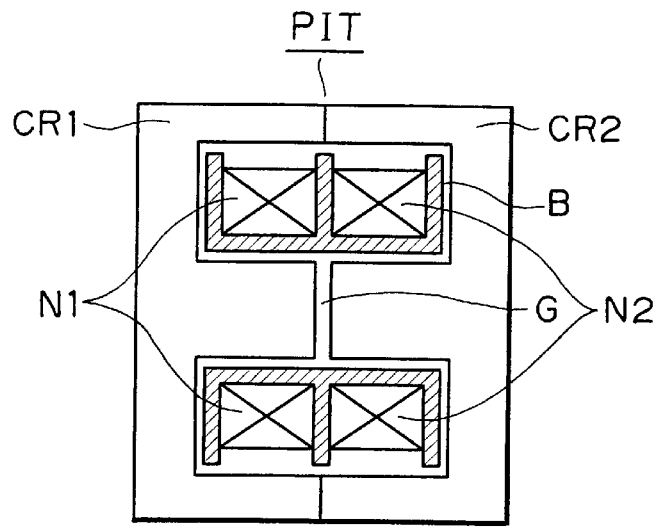
FIG. 2 is a diagram showing a side cross section of the structure of an insulating converter transformer employed in the switching power-supply circuit implemented by the embodiment.

As shown in FIG. 2, the insulating converter transformer PIT employed in the embodiment comprises cores CR1 and CR2 made typically of a ferrite material. The cores CR1 and CR2 have the ends of their magnetic legs joined to each other to form an assembly of an EE-shaped core. Around the middle magnetic legs of the EE-shaped core, a primary winding N1 and a secondary winding N2 are wound. The primary winding N1 (and a tertiary winding N3) and the secondary winding N2 are separated from each other by using bobbins B. There is a gap G between the middle magnetic leg of the core CR1 and the middle magnetic leg of the core CR2 as shown in the figure. In this way, loose coupling provided by a necessary coupling coefficient k is obtained.

The gap G is formed by making the middle magnetic leg of the E-shaped core CR1 shorter than the 2 magnetic legs at the edges of the core CR1 and making the middle magnetic leg of the E-shaped core CR2 shorter than the 2 magnetic legs at the edges of the core CR2. The coupling coefficient k is set at a value of about 0.85 to give the loose coupling. As a result, it is difficult to obtain a saturated state.

One end of the primary winding N1 employed in the insulating converter transformer PIT is connected to the collector of the switching device Q1. The other end of the primary winding N1 is connected to the positive-electrode terminal of the smoothing capacitor C1 (the rectified and smoothed voltage Ei) by the detection winding ND to form a series connection with the winding ND.

Additionally, the tertiary winding N3 which is formed by winding up the primary winding functions as a feedback winding, and is connected to a cathode of a high-speed recovery diode D1 in the power-factor improvement circuit 10 by way of a series-resonance capacitor C3.

On the secondary side of the insulating converter transformer PIT, an alternating voltage induced by the primary winding N1 is generated at the secondary winding N2. Since a secondary-side parallel-resonance capacitor C2 is connected in parallel to the secondary winding N2, the leakage inductance L2 of the secondary winding N2 and the capacitance of the secondary-side parallel-resonance capacitor C2 form a parallel-resonance circuit. The parallel-resonance circuit makes the alternating voltage a resonance voltage. That is to say, a voltage resonance operation is carried out on the secondary side.

In other words, on the primary side of the switching power-supply circuit, there is provided a parallel-resonance circuit for making a switching operation a voltage resonance operation. On the secondary side of the switching power-supply circuit, there is also provided a parallel-resonance circuit for carrying out a voltage resonance operation. It should be noted that, in this specification, a switching converter with a configuration wherein resonance circuits provided on the primary and secondary sides operate as described above is referred to as a compound-resonance switching converter.

For the parallel-resonance circuit provided on the secondary side as described above, taps are provided on the secondary winding N2. In addition, on the secondary side, rectifier diodes D01, D02, D03 and D04 as well as smoothing capacitors C01 and C02 are connected as shown in the figure to form 2 full-wave rectifier circuits. To be more specific, one of the 2 full-wave rectifier circuits for generating a direct-current output voltage E01 is a set to comprise the rectifier diodes D01 and D02 and the smoothing capacitor C01 whereas the other full-wave rectifier circuit for generating a direct-current output voltage E02 is a set to comprise the rectifier diodes D03 and D04 and the smoothing capacitor C02.

It should be noted that the direct-current output voltage E01 and the direct-current output voltage E02 are supplied to the control circuit 1 separately. The control circuit 1 uses the direct-current output voltage E01 as a detection voltage and the direct-current output voltage E02 as an operation power supply.

The control circuit 1 executes constant-voltage control to be described later. To put it concretely, the control circuit 1 supplies a DC current to the control winding NC of the drive transformer PRT as a control current. Typically, the magnitude of the control current is adjusted in accordance with variations in directcurrent output voltage E01 on the secondary side.

A mutual inductance M between the inductance L1 of the primary winding N1 and the inductance L2 of the secondary winding N2 in the insulating converter transformer PIT can be +M or −M on a relation between the polarities (or the winding directions) of the primary winding N1 and the secondary winding N2 and the connections of the rectifier diodes D0, namely, the diodes D01, D02, D03 and D04.

Figure 3A:
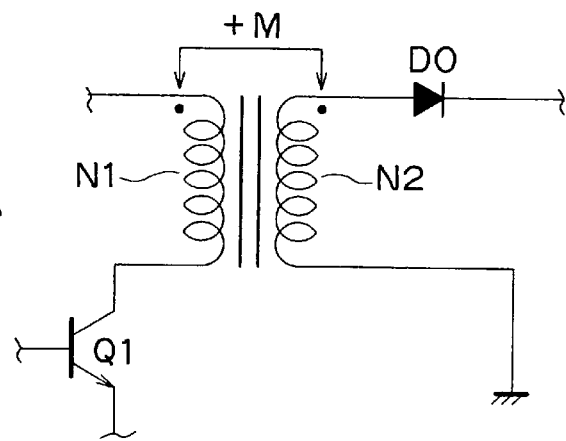
FIGS. 3A and 3B are explanatory diagrams used for explaining operations for mutual inductances of +M and −M.
Figure 3B:
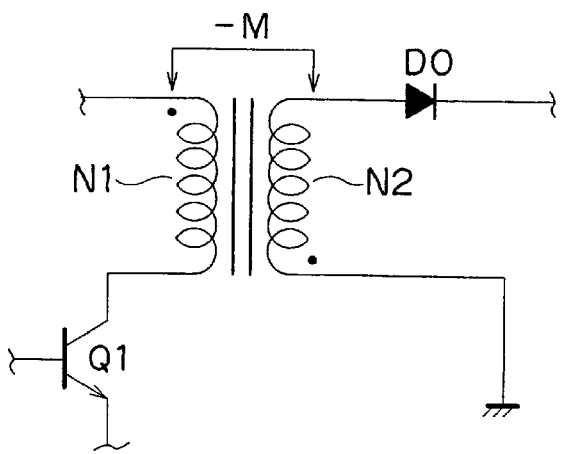

In the case of the connections shown in FIG. 3A, for example, the mutual inductance is +M (that is, an additive polarity or a forward system). In the case of the connections shown in FIG. 3B, on the other hand, the mutual inductance is −M (that is, a subtractive polarity or a fly-back system).

Assuming that the mutual inductance M is associated with the operation on the secondary side of the switching power-supply circuit shown in FIG. 1, when the alternating voltage obtained at the secondary winding N2 has a positive polarity, for example, a rectified current flows through the rectifier diodes D01 and D03. This operation can be regarded as a +M operating mode or the forward system. When the alternating voltage obtained at the secondary winding N2 has a negative polarity, on the other hand, a rectified current flows though the rectifier diodes D02 and D04. This operation can be regarded as a −M operating mode or the fly-back system. That is to say, when the alternating voltage obtained at the secondary winding N2 in this switching power-supply circuit becomes positive or negative, the mutual inductance operates in the +M or −M operating mode respectively.

The control circuit 1 changes the level of a DC control current flowing through the control winding NC in accordance with variations in secondary-side direct-current output voltage level E01 in order to control variations of the inductance LB of the driving winding NB wound in the orthogonal control transformer PRT. Thus, the resonance condition of a series-resonance circuit in the self-excitation oscillation driving circuit for the switching device Q1 also changes since the series-resonance circuit includes the inductance LB of the driving winding NB. The variations of the level of the DC control current thus result in changes in switching frequency of the switching device Q1. The variations provide an effect of stabilization of the secondary-side direct-current output voltage.

In addition, control executed in the circuit shown in this figure may be interpreted as follows. The switching frequency is changed by controlling variations of the conduction period of the switching device Q1 with the non-conduction period fixed. That is to say, in a constant-voltage control operation in this switching power-supply circuit, variations in switching frequency are controlled. Thus, a resonance impedance for the switching output is controlled. At the same time, control of the conduction angle of the switching device Q1 in a switching period, that is, PWM control, is executed. These compound control operations are carried out by a single control circuit.

As the control of the switching frequency, when the secondary-side output voltage rises due to a decrease in load, for example, control is executed to increase the switching frequency so as to suppress the secondary-side output.

Next, the configuration of the power-factor improvement circuit 10 is explained.

In the power-factor improvement circuit 10 shown in the figure, a series connection comprising the filter choke coil LN, the high-speed recovery diode D1 and the choke coil LS is connected between a positive-electrode output terminal of the bridge rectifier circuit Di and the positive-electrode terminal of the smoothing capacitor Ci.

The filter capacitor CN is connected between the anode of the high-speed recovery diode D1 and the positive electrode terminal of the smoothing capacitor Ci. The filter capacitor CN and the filter choke coil LN constitute a normal-mode low-pass filter.

In the power-factor improvement circuit 10, a connection point between the cathode of the high-speed recovery diode D1 and the choke coil LS is connected to the tertiary winding N3 of the insulating converter transformer PIT by way of the series-resonance capacitor C3 thereby to feed back the switching output voltage (or the voltage-resonance pulse voltage) obtained at the primary-side parallel-resonance circuit to the power-factor improvement circuit 10.

Basically, the power-factor improvement circuit 10 carries out a power-factor improvement operation as follows.

In the configuration of the power-factor improvement circuit 10 shown in the figure, the switching output obtained in the primary-side parallel-resonance circuit is fed back as described above. The switching output fed back causes an alternating voltage having a switching period to be superposed on the rectified-current path. The superposition of the alternating voltage having the switching period in turn causes a rectified current to flow through the high-speed recovery diode D1 intermittently at the switching period. The intermittent flow of the rectified current causes the inductance of the filter choke coil LN and the choke coil LS to appear higher. Thus, also during a period in which the level of the rectified output voltage is lower than the voltage appearing between the terminals of the smoothing capacitor Ci, a charging current flows to the smoothing capacitor Ci.

As a result, the average waveform of the AC input current approaches the waveform of the AC input voltage and the conduction angle of the AC input current increases to improve the power factor.

The tertiary winding N3 of the insulating converter transformer PIT described above is connected to the cathode of the high-speed recovery diode D1 by way of the series-resonance capacitor C3. By connecting the tertiary winding N3 in this way, there is formed a circuit functioning as a voltage feedback system for feeding back a voltage-resonance pulse voltage which is a switching output obtained at the primary-side parallel-resonance circuit to the connection point of the high-speed recovery diode D1 and the choke coil LS.

The voltage resonance pulse voltage generated in the OFF period of the switching device Q1 becomes positive on the smoothing capacitor Ci side. Accordingly, even if the AC input voltage VAC is lower than the voltage Ei of the smoothing capacitor Ci, as long as a voltage obtained by adding a pulse voltage of the tertiary winding N3 to the AC input voltage VAC is higher than the voltage Ei, the AC input current IAC from the AC power supply AC is charged in the smoothing capacitor Ci by way of the bridge rectifier circuit Di→filter choke coil LN→high-speed recovery diode D1→choke coil LS.

In this way, as shown in FIGS. 4A to 4F, the conduction angle is enlarged, to improve the power factor PF.

FIGS. 4A to 4 F show respective operation waveforms of the AC input voltage VAC, AC input current IAC, feedback voltage V2, current ILS flowing in the choke coil LS, feedback current IC3, and current ID1 flowing in the high-speed recovery diode D1.

The excitation energy released from the tertiary winding N3 is a different form of the charging energy of the smoothing capacitor Ci, which becomes the charging current (current ILS) to charge the smoothing capacitor Ci, and is returned into the charging energy.

According to such a voltage feedback system, in a period in which the AC input voltage VAC is low, the high-speed recovery diode D1 becomes the OFF state and thereby the current ID2 does not flow.

FIGS. 5A and 5B show waveforms of voltages V3 and V1 as the operation waveforms of the tertiary winding N3 at the switching period equivalent to the time point in which the AC input voltage VAC shown in FIG. 4A becomes zero.

In the OFF period of the high-speed recovery diode D1, the voltage V3 forms a series-resonance circuit with the series-resonance capacitor C3 via the choke coil LS; while in the ON period of the high-speed recovery diode D1, a series-resonance circuit is formed by the seriesresonance capacitor C3, filter capacitor CN, and the inductance of the tertiary winding N3.

The switching power-supply circuit was tested in an experiment under conditions of using the filter choke coil LN with an inductance of 100 $\mu$H, the filter capacitor CN with a capacitance of 1 $\mu$F, the choke coil LS with an inductance of 68 $\mu$H, the primary winding N1 with a magnetic flux density of 30 T, the tertiary winding N3 with a magnetic flux density of 5 T, and the series-resonance capacitor C3 with a capacitance of 0.1 $\mu$F in a control range from a switching frequency fs of 100 KHz to a switching frequency of 200 KHz for variations in AC input voltage VAC from 80 V to 140 V in a load-power range between a maximum load power POmax of 140 W and a minimum load power POmin of 0 W.

As a result of the experiment, the power factor PF was maintained at a fixed value of about 0.8 under a condition of load power PO in the range 140 W to 20 W for variations in an AC input voltage VAC in the range 80 V to 140 V as shown in FIG. 6.

Likewise, a power factor PF of about 0.8 was obtained under a condition of the load-power PO range 140 W to 20 W for variations in AC input voltage VAC of 100 V as shown in FIG. 7.

In addition, the 50-Hz ripple voltage component of the secondary-side direct-current output voltage level E01 does not increase to more than about 50 mV to 75 mV in comparison with a switching power-supply circuit without employing the power-factor improvement circuit 10. Such a small ripple voltage component is within a range that does not raise a problem in practical applications of the switching power-supply circuit such as a color television.

As described above, with the switching power-supply circuit implemented by the embodiment, a high power factor can be maintained despite variations in AC input voltage and load power. For this reason, the switching power-supply circuit implemented by the embodiment can be used as a power supply sufficient for practical purposes not only in equipment with a specified AC-input-voltage condition and a specified load condition such as a television receiver, but also equipment with typically a variable load condition such as office equipment and a personal computer.

Figure 8:
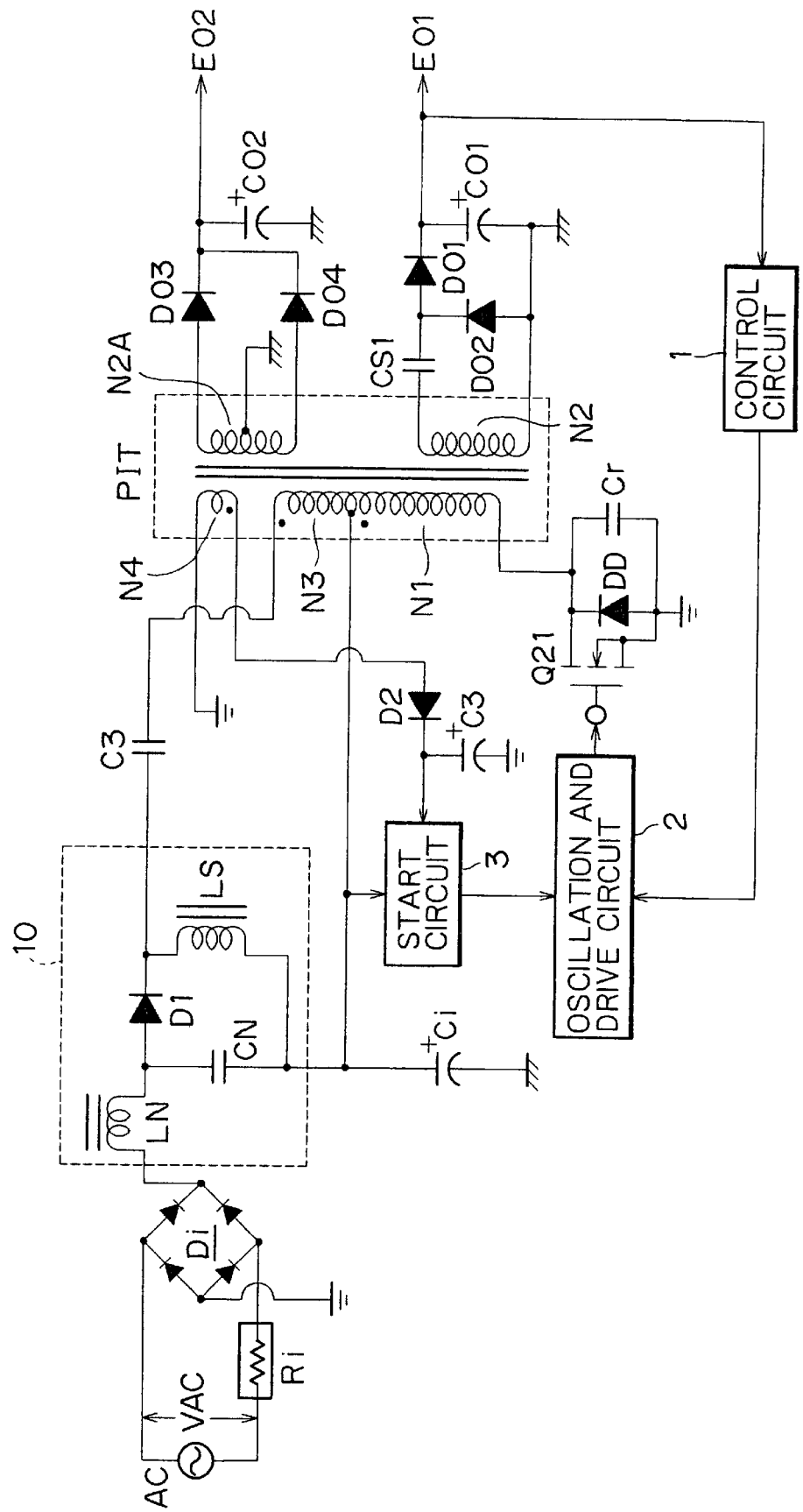
FIG. 8 is a circuit diagram showing the configuration of a switching power-supply circuit implemented by a second embodiment of the present invention.

Next, a second embodiment of the present invention is explained by referring to FIG. 8.

FIG. 8 is a circuit diagram showing the configuration of a switching power-supply circuit implemented by the second embodiment of the present invention. It should be noted that components identical with those shown in FIGS. 1, 9 and 10 are denoted by the same reference numerals as the latter, and their explanation is not repeated.

A voltage-resonance converter provided on the primary side as shown in the figure adopts a separate-excitation configuration, which employs a switching device Q21 typically implemented by a single MOS-FET. The drain of the switching device Q21 is connected to the positive-electrode terminal of the smoothing capacitor Ci by the primary winding N1 and the source thereof is connected to the ground.

In this case, the parallel-resonance capacitor Cr is also connected between the drain and source of the switching device Q21.

A clamp diode DD is connected between the drain and the source of the switching device Q21 in parallel to the switching device Q21.

The switching device Q21 is driven by the oscillation and drive circuit 2 into a switching operation explained earlier by referring to FIG. 1.

To put it in detail, a current or a voltage with a magnitude varying in accordance with changes in secondary-side direct-current output voltage E01 is supplied by the control circuit 1 to the oscillation and drive circuit 2. The oscillation and drive circuit 2 outputs a switching driving signal (voltage) to the gate of the switching device Q21. The period of the switching driving signal is changed in accordance with the magnitude of the current or the voltage received from the control circuit 1 in order to stabilize the secondary-side direct-current output voltage E01. In this way, the switching frequency of the switching device Q21 is varied. As described earlier by referring to FIG. 1, the switching frequency of the switching device Q21 is varied by the switching driving signal, which changes the conduction period of the switching device Q21 but keeps the non-conduction period thereof at a fixed value.

A rectified and smoothed voltage Ei obtained at the smoothing capacitor Ci is supplied to the start circuit 3 as an operation power supply. The start circuit 3 carries out an operation to start the oscillation and drive circuit 2 by receiving a voltage at a start time from an additional winding N4 of the insulating converter transformer PIT.

The power-factor improvement circuit 10 shown in FIG. 8 is similar to the power-factor improvement circuit 10 shown in FIG. 1.

In the insulating converter transformer PIT, the tertiary winding N3 (feedback winding) is formed by winding up the primary winding. The tertiary winding N3 is connected to the cathode of the high-speed recovery diode D1 in the power-factor improvement circuit 10 by way of the series-resonance capacitor C3.

Even with configuration, like the example described with reference to FIG. 1, even if the AC input voltage VAC is lower than the voltage Ei of the smoothing capacitor Ci, as long as a voltage obtained by adding a pulse voltage of the tertiary winding N3 to the AC input voltage VAC is higher than the voltage Ei, the AC input current IAC from the AC power supply AC is charged in the smoothing capacitor Ci by way of the bridge rectifier circuit Di→filter choke coil LN→high-speed recovery diode D1→choke coil LS. As a result, the conduction angle is enlarged, to improve the power factor PF.

Thereby, a high power factor can be maintained despite variations in AC input voltage and load power. For this reason, the switching power-supply circuit implemented by the embodiment can be used as a power supply sufficient for practical purposes not only in equipment with a specified AC-input-voltage condition and a specified load condition such as a television receiver, but also equipment with typically a variable load condition such as office equipment and a personal computer.

By the way, on the secondary side of the switching power-supply circuit shown in FIG. 8, one end of the secondary winding N2 is connected to the secondary-side ground and the other end thereof is connected by a series-resonance capacitor Cs1 to a connection point between the anode of a rectifier diode D01 and the cathode of a rectifier diode D02. The cathode of the rectifier diode D01 is connected to the positive-electrode terminal of a smoothing capacitor C01 and the anode of the rectifier diode D02 is connected to the ground on the secondary side. The negative-electrode terminal of the smoothing capacitor C01 is also connected to the ground on the secondary side.

In the end, with such connections, a voltage multiplying full-wave rectifier circuit comprising a set of the series-resonance capacitor Cs1, the rectifier diodes D01 and D02 and a smoothing capacitor C01 is provided. The capacitance of the series-resonance capacitor Cs1 and the leakage inductance of the secondary winding N2 form a series-resonance circuit corresponding to the on/off operations of the rectifier diodes D01 and D02.

That is to say, the switching power-supply circuit implemented by this embodiment adopts the configuration of a compound-resonance switching converter, which is provided with a parallel-resonance circuit for making the switching operation voltage resonance on the primary side and a series-resonance circuit for providing a voltage multiplying full-wave rectification operation on the secondary side.

The voltage multiplying full-wave rectification operation of the set of the series-resonance capacitor Cs1, the rectifier diodes D01 and D02 and a smoothing capacitor C01 is explained as follows.

The switching output generated at the primary winding N1 by the switching operation on the primary side excites the secondary winding N2.

During a period in which the rectifier diode D01 is turned off and the rectifier diode D02 is turned on, the polarities of the primary winding N1 and the secondary winding N2, that is, the mutual inductance M, result in an operation in a –M subtractive polarity mode wherein a series-resonance effect provided by the leakage inductance of the secondary winding N2 and the capacitance of the series-resonance capacitor Cs1 electrically charges the series-resonance capacitor Cs1 with a current IC2 rectified by the rectifier diode D02.

During the period of a rectification operation in which the rectifier diode D02 is turned off and the rectifier diode D01 is turned on, on the other hand, the polarities of the primary winding N1 and the secondary winding N2, that is, the mutual inductance M, result in an operation in a +M additive polarity mode wherein the smoothing capacitor C01 is electrically charged in a state of series resonance. In the series-resonance state, the electric potential of the series-resonance capacitor Cs1 is added to a voltage induced in the secondary winding N2.

As described above, a rectification operation is carried out by using the 2 modes, namely, the additive mode (that is, the +M operating mode or the forward mode) and the subtractive mode (that is, the –M operating mode or the fly-back mode), to generate a direct-current output voltage E01 at the smoothing capacitor C01. The direct-current output voltage E01 is about twice a voltage induced in the secondary winding N2.

In the configuration described above, on the secondary side of the switching power-supply circuit shown in FIG. 8, voltage multiplying full-wave rectification is carried out to generate a direct-current output voltage on the secondary side in a state comprising 2 operating modes, in which the mutual inductance is +M and –M respectively. That is to say, since an electromagnetic energy generated by a current resonance effect on the primary side and an electromagnetic energy generated by a current resonance effect on the secondary side are supplied to the load at the same time, the magnitude of a power supplied to the load increases accordingly. As a result, the maximum load power increases considerably.

As described above, the secondary-side direct-current output voltage is generated by a voltage multiplying full-wave rectifier circuit. If it is desired to generate a secondary-side direct-current output voltage at a level equal to a secondary-side direct-current output voltage generated by an equal-voltage full-wave rectifier circuit, the number of turns of the secondary winding N2 employed in this embodiment is merely cut in half. The reduced number of turns decreases the size, the weight and the cost of the insulating converter transformer PIT.

It should be noted that, in this case, another secondary winding N2A is provided independently of the secondary winding N2. The center tap of the secondary winding N2A is connected to the ground. Rectifier diodes D03 and D04 and a smoothing capacitor C02 are connected to the secondary winding N2A to form a full-wave rectifier circuit for generating another direct-current output voltage E02.

In addition to the preferred embodiments described above, a variety of modified versions are conceivable for the present invention.

For example, the applicant for a patent of the present invention has also already proposed a configuration of a quadruple-voltage rectifier circuit employing a secondary-side series-resonance circuit as a compound-resonance switching converter. Such a configuration may be considered as a modified version of the embodiment described above. That is to say, embodiments of the present invention are not limited in particular to the configuration comprising a rectifier circuit and a resonance circuit on the secondary side.

In the embodiments described above, the voltage-resonance converter provided on the primary side adopts the so-called single-end system using a single switching device. It should be noted that the present invention can also be applied to the so-called push-pull system wherein 2 switching devices are switched alternately.

As described above, the present invention provides a switching power-supply circuit employing a power-factor improvement circuit for a compound-resonance converter wherein a switching output voltage obtained at a primary-side resonance circuit is fed back to the power-factor improvement circuit by way of a tertiary winding and a series-resonance capacitor.

Thereby, there is exhibited an effect of maintaining the power factor at a fixed value over a wide range of variations in AC input voltage and a broad range of variations in load power. For this reason, as a switching power-supply circuit with an improved power factor, the present invention is capable of keeping up with a wide range of applications including a system with an AC voltage AC of 100 V and a system with an AC voltage AC of 200 V or suitable for equipment with large load variations such as office and information equipment.

In addition, since a 50-Hz ripple voltage component included in the direct-current output voltage does not increase much or hardly increases, no special countermeasure for the ripple voltage component is required. Thus, the switching power-supply circuit provided by the present invention offers merits such as no need for improving the gain of the control circuit and no need for increasing the capacitance of the electrolytic capacitor.

What is claimed is:

1. A switching power-supply circuit comprising:

rectifying and smoothing means for inputting a commercial AC power supply, generating a rectified and smoothed voltage and outputting said rectified and smoothed voltage as a direct-current input voltage;

an insulating converter transformer for transferring a primary-side output to a secondary side wherein a gap is created to give a required coupling coefficient providing loose coupling;

switching means including a switching device for intermittently passing on said direct-current input voltage to a primary winding of said insulating converter transformer;

a primary-side resonance circuit translating an operation of said switching means into voltage resonance and comprising a leakage inductance component including at least a primary winding of said insulating converter transformer and a capacitance component including a primary-side parallel-resonance capacitor;

power-factor improvement means for improving a power factor by:

feeding back a switching output voltage obtained at said primary-side resonance circuit to said power-factor improvement means by way a tertiary winding formed by winding up a primary winding of said insulating converter transformer, and a series-resonance capacitor by supplying said switching output voltage to a rectified-current path; and generating intermittently a rectified current based on said fed-back switching output voltage;

a secondary-side resonance circuit comprising a leakage inductance component including a secondary winding of said insulating converter transformer and a capacitance component including a secondary-side resonance capacitor on a secondary side of said insulating converter transformer;

direct-current output voltage generation means including said secondary-side resonance circuit and carrying out operations to input and rectify an alternating voltage obtained at a secondary winding of said insulating converter transformer in order to generate a secondary-side direct-current output voltage; and constant-voltage control means for executing constant-voltage control on said secondary-side direct-current output voltage in accordance with the level of said secondary-side direct-current output voltage.

2. A switching power-supply circuit according to claim 1 wherein: said power-factor improvement means employs a high-speed recovery diode for making a flow of a rectified current intermittent; and said series-resonance capacitor is wired between a cathode of said high-speed recovery diode and said tertiary winding.

* * * * *